United States Patent [19]

Wadia

[11] Patent Number: 4,720,869
[45] Date of Patent: Jan. 19, 1988

[54] HAND DIMENSION VERIFICATION

[75] Inventor: Aspi B. Wadia, Charlotte, N.C.

[73] Assignee: International Business Machines Corporation, Armonk, N.Y.

[21] Appl. No.: 830,772

[22] Filed: Feb. 18, 1986

[51] Int. Cl.$^4$ ............................................. G06K 9/00
[52] U.S. Cl. ......................................... 382/2; 356/71; 382/22; 382/25
[58] Field of Search ...................... 382/2, 4, 21, 22, 23, 382/24, 25, 58, 62, 65; 340/825.31, 825.34; 250/560, 561; 356/2, 71, 376; 358/199, 200, 202–207

[56] References Cited

U.S. PATENT DOCUMENTS

| | | | |
|---|---|---|---|
| 3,576,537 | 4/1971 | Ernst | 340/149 |
| 3,576,538 | 4/1971 | Miller | 340/149 |
| 3,648,240 | 3/1972 | Jacoby et al. | 382/2 |
| 4,032,889 | 6/1977 | Nassimbene | 340/146.3 |
| 4,186,378 | 1/1980 | Moulton | 382/2 |
| 4,206,441 | 6/1980 | Kondo | 382/21 |
| 4,371,865 | 2/1983 | Moulton | 340/146.3 |
| 4,573,193 | 2/1986 | Shuto et al. | 382/2 |
| 4,627,734 | 12/1986 | Rioux | 356/376 |

OTHER PUBLICATIONS

Automatic Palmprint Verification Study-J. R. Young et al-Jun. 1981.
Low Cost Personal Identification Verification Device Based on Finger Dimensions, IBM Technical Disclosure Bulletin, vol. 25, No. 4, Sep. 1982, p. 1829.

Primary Examiner—Leo H. Boudreau
Assistant Examiner—Jose L. Couso
Attorney, Agent, or Firm—Kenneth A. Seaman

[57] ABSTRACT

Improved method and apparatus are provided for hand dimension verification. A two dimensional scanner provides image data from top and angled scans to an image processor which processes this data to develop invariable hand measurements using reference points located from contour sequences generated from the image scan data. The reference points are located so as to be immune from variations introduced by fingernail length, hand pressure and finger spread. Finger width measurements are made using certain reference points and finger width variations are used to determine the presence of abnormalities which could be natural or introduced by wearing of jewelry. The finger width variations are in effect removed by locating finger contour points at the beginning and ending of the variations and using finger slope data for trimming and thereby provide invariable finger width measurements together with finger thickness, finger length and hand area measurements for hand dimension verification.

21 Claims, 20 Drawing Figures

| SCAN# | RESULTING SEQUENCE |
|---|---|
| S1 | 1,2̌ |
| S2 | 3̌,4̌,5̌,1,2,6̌,7̌,8̌ |
| S3 | 9̌,3,4,10̌,11̌,5,1,2,6,12̌,13̌,7,8,14̌ |
| S4 | 15̌,16̌,17̌,9...,10,18̌,19̌,11...,12,20̌,21̌,13...,14,22̌ |
| S5 | 23̌,15,16,24̌,25̌,17...,20,26̌,27̌,21...,22,28̌ |
| S6 | 29̌,23...,28,30̌ |
| S7 | 31̌,29...,30,32̌ |
| S8 | 33̌,31...,32,34̌ |
| S9 | 35̌,33...,34,36̌ |
| S10 | 37,35,33,31,29,23,15,16,24,25,17,9,3,4, 10,18,19,11,5,1,2,6,12,20,26,27,21,13, 7,8,14,22,28,30,32,34,36,38 |

HAND DIMENSION VERIFICATION

TECHNICAL FIELD

This invention relates to improved hand dimension verification and more particularly to apparatus for determining hand dimensions which does not require hand constraint and is immune to dimensional characteristic variations introduced by growth of fingernails, false fingernails, jewelry and other like elements.

BACKGROUND ART

Verification of hand dimensionality provides personal identification which is used for access control verification during a financial transaction and operator verification such as for the wire transfer of bank funds. Hand dimensional verification has been found to be an acceptable way to determine personal identification but in the past has suffered from various factors. One of these factors is hand constraint. Hand constraint is primarily objectionable from a human factors point of view. For example U.S. Pat. No. 3,648,240 describes personal identification apparatus which has hand constraint that is less objectionable than in U.S. Pat. No. 3,576,538. A still different hand constraint is set forth in the hand identification system of U.S. Pat. No. 3,576,537. In addition to the hand constraint factor of the personal identification apparatus in these patents, variations of hand dimensional characteristics are not taken into account. Hence, the validity or foolproofness of these identification systems is not strong. The need for a hand dimensional verification system which obviates or is immune to hand dimensional variations caused for example by fingernail growth is recognized by the publication in the IBM Technical Disclosure Bulletin Vol. 25 No. 4 September 1982 p1829 entitled "Low Cost Personal Identification Verification Device Based On Finger Dimensions". This publication teaches the measuring of indent points which are considered to be invariable with fingernail growth. An indent point is the base of adjacent finger contact. In order for an indent point to be non variable it requires the hand to be closed, constrained and the placement pressure must be substantially uniform, otherwise there will be errors. Additionally this publication does not disclose how any hand dimensions are to be measured using these indent points.

SUMMARY OF THE INVENTION

The principal object of the present invention is to provide apparatus for determining hand dimensions to facilitate personal identification with a high degree of certainty. Another significant object of the invention is to provide apparatus for determining hand dimensions which is immune to variations introduced by fingernail extension, jewelry, hand orientation and placement pressure of the hand.

The foregoing objects are achieved by scanning the hand from two different angles to define certain bench mark points on the hand which serve as hand dimension end points and which are not affected by finger nail extension, jewelry or placement pressure of the hand. The views of the hand at the two different scanning angles are obtained using a relatively simple scanning apparatus. In one embodiment a scanning algorithm is used which generates a hand contour sequence as scanning takes place so as to eliminate the need for first storing data collected during the scanning and thereafter generate a hand contour sequence. The length, width and thickness of fingers and area of the hand are defined to provide hand dimension verification with a high degree of accuracy. One of the scanning views is at an angle which in addition to enabling the establishment of invariant reference points enables finger thickness measurement at a sectional angle to give an added dimension to improve the validity of the personal identification. Contour sequences for determining finger thickness are used to trim out sections thereof to eliminate variations caused by wearing jewelry.

DETAILED DESCRIPTION

Figure 1:
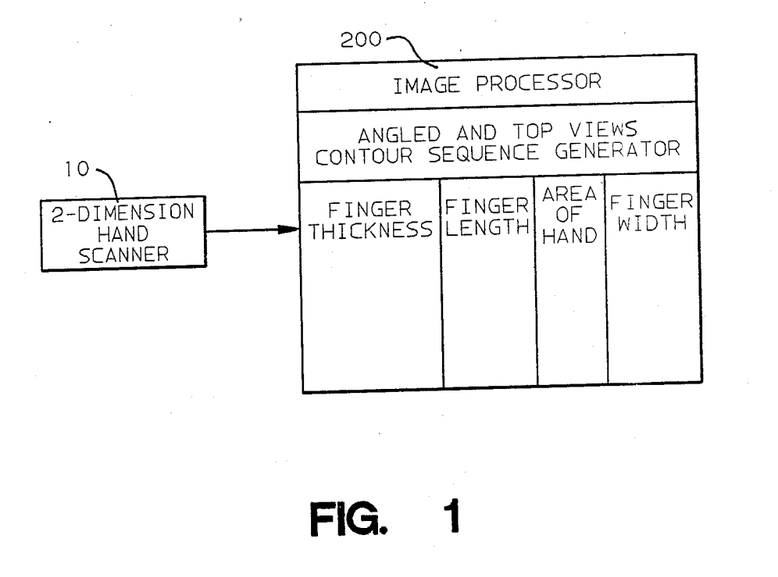
FIG. 1 is a schematic block diagram illustrating the invention.
Figure 6:
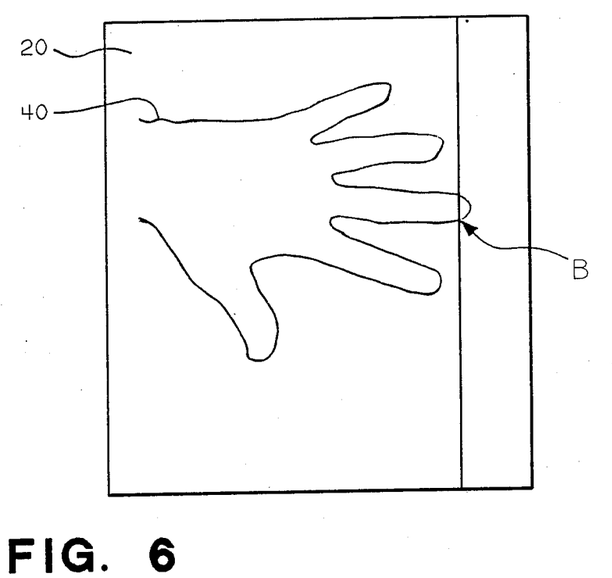
FIG. 6 is a schematic diagram showing a hand silhouette resulting from a top scan of the hand.
Figure 7:
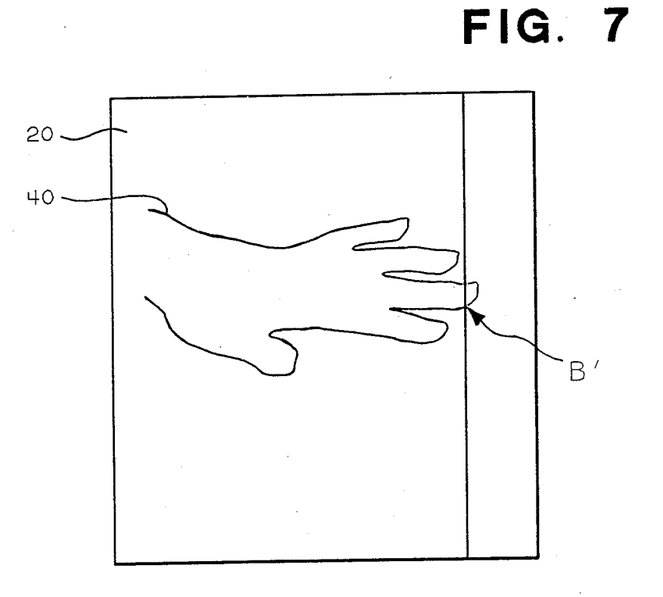
FIG. 7 is a schematic diagram showing a hand silhouette resulting from an angled scan of the hand.

With reference to the drawings and particularly to FIG. 1 the invention is illustrated by way of example as including a two dimension hand scanner 10 which operates to scan an unconstrained hand 40 held flat against a glass plate 20, FIG. 6, and generate electrical signals representing a top image of the hand as in FIG. 6 and an angled image of the hand as in FIG. 7. The electrical signals generated by scanner 10 are analog signals which are converted to digital signals and processed by image processor 200, FIG. 1.

Figure 2:
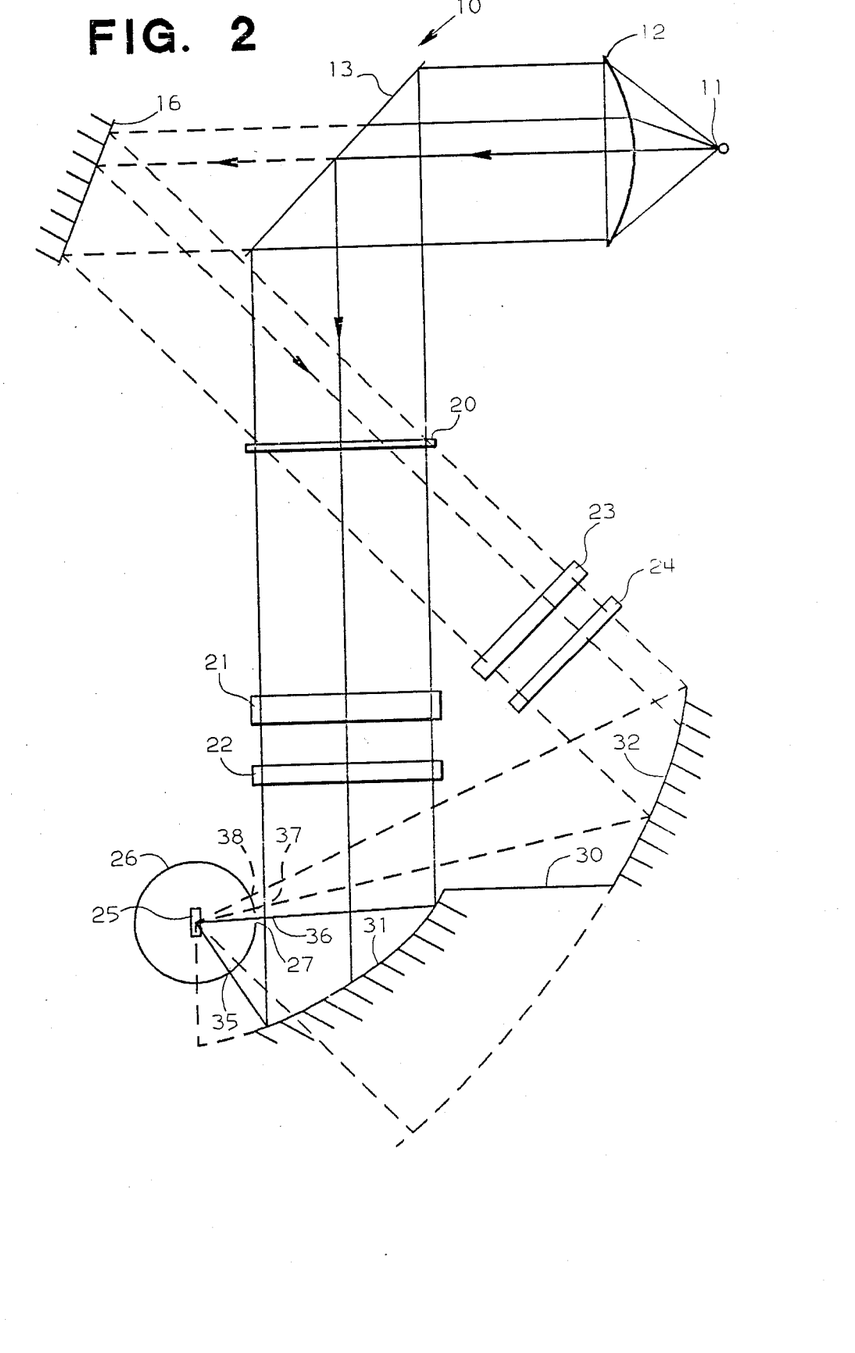
FIG. 2 is a front view schematic diagram illustrating one embodiment of a two dimensional scanner of FIG. 1.

A suitable two dimensional scanner 10 for the present invention is shown in FIG. 2 and includes a point light source 11 positioned at the focus of spherical lens 12. Spherical lens 12 passes light rays form light source 11 as a bundle of parallel rays which strike a half silvered mirror 13 positioned at a 45 degree angle to the horizontal whereby approximately half of the parallel light rays are reflected downwardly at a 90 degree angle to the horizontal to impinge upon glass plate 20 perpendicular thereto and the other half of the parallel light rays are passed by mirror 13 to strike a mirror 16 inclined at a 67.5 degree angle to the horizontal. Mirror 16 reflects the light rays passed by mirror 13 so that they impinge upon glass plate 20 at a 45 degree angle to the horizontal; glass plate 20 is lying in a horizontal plane. The portion of the two dimensional scanner 10 just described is the illumination portion. The remaining portion of two dimensional scanner 10 is the scanning portion.

Those parallel rays of light striking glass plate 20 at a 90 degree angle which are not blocked by the hand being scanned are passed to impinge upon cylindrical lens 21 which causes the parallel light rays to converge to its focus. The converging light rays are passed to another cylindrical lens 22 which causes the converging light rays to diverge and form a bundle of parallel light rays having a width corresponding to the width of a linear array of charge coupled devices 25. The linear array of charge coupled devices 25 is positioned within the interior of rotatable scanning drum 26 which has a longitudinal peripheral slot 27. In this example drum 26 is rotated counter clockwise and the linear array of charge coupled devices 25 rotates with drum 26 and in registration with slot 27.

The bundle of parallel light rays passed by lens 22 strike a parabolic section 31 of cylindrical mirror 30. The focus of parabolic section 31 is at the linear array of charge coupled devices 25 and it has an axis IO which is parallel to the light rays passed by lens 22. The light rays striking glass plate 20 at a 45 degree angle and which are not blocked by the hand being scanned pass on to strike cylindrical lens 23 positioned at a 45 degree angle perpendicularly. Lens 23 causes these light rays to converge and the converging light rays strike cylindrical lens 24 which is parallel to lens 23. Lens 24 causes the converging light rays to diverge in the form of a bundle of parallel light rays having a width corresponding to the width of the linear array of the charge coupled devices 25. This bundle of parallel light rays strike a parabolic section 32 of mirror 30 which has a focus located at the position of the linear array of charge coupled devices 25. The parabolic section 32 has an axis $IO^1$ which is parallel to the bundle of light rays passed by lens 24.

By this arrangement as the scanning drum 26 and linear array of charge coupled devices 25 rotate counter clockwise, the slot 27 will progressively scan the bundle of light rays reflected from the parabolic section 31 as it moves from position 35 to position 36. Then as the drum 26 continues to rotate, slot 27 will scan the bundle of light rays reflected from parabolic section 32 as it moved from position 37 to position 38.

The resolution of the scanning section is related to the number of elements forming the linear array of charge coupled devices 25 and the sampling rate thereof. The linear array 25 can have 1024 elements, for example, and be sampled 1024 times as slot 27 scans each bundle of light rays reflected from parabolic surfaces 31 and 32 respectively to result in a matrix of 1024×1024 for the top scan of the hand silhouette 40 in FIG. 6 and for the angled scans of the hand silhouette 40 in FIG. 7. An emitter 45 rotating with drum 26 provides the timing signals to image processor 200 for indicating when the top and angled scans are taking place.

Figures 3, 4:
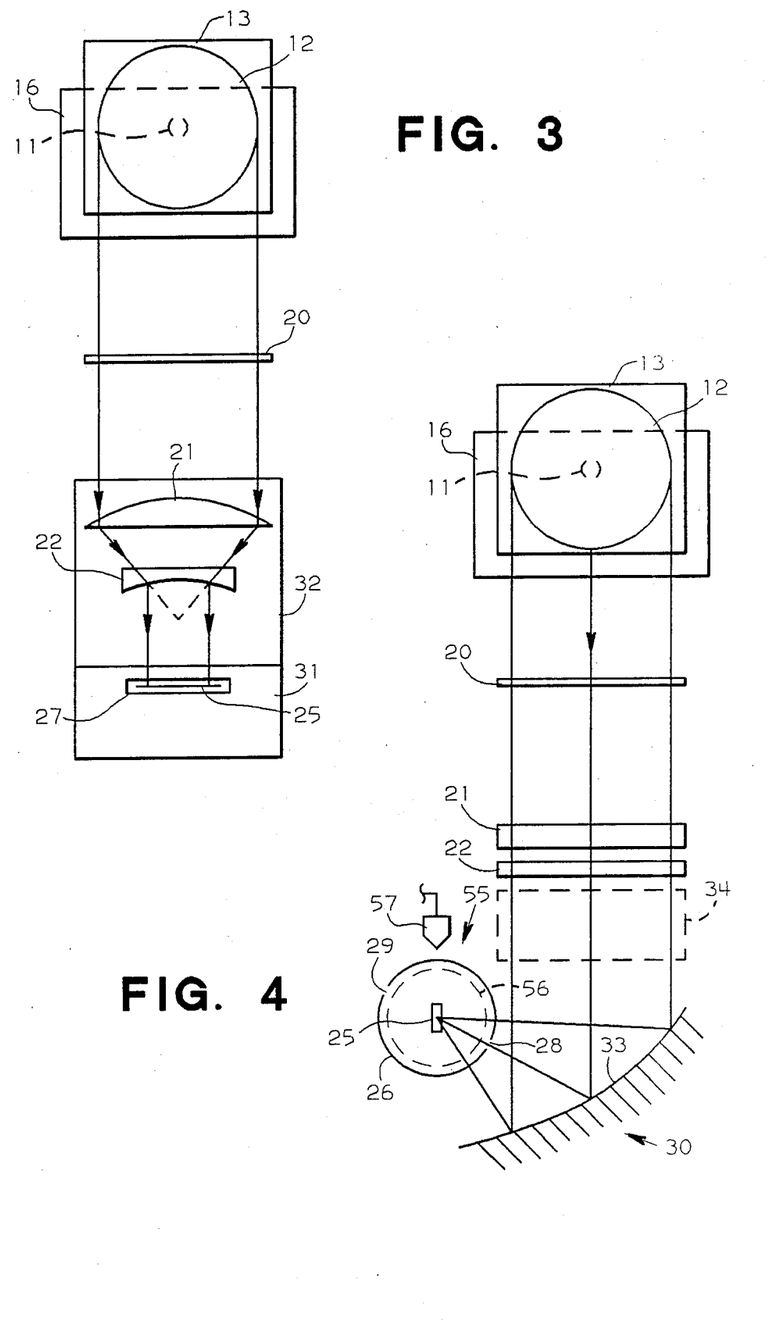
FIG. 3 is a side view schematic diagram of the two dimensional scanner of FIG. 2.
FIG. 4 is a front view schematic diagram illustrating another embodiment of a two dimensional scanner of FIG. 1.
Figure 5:
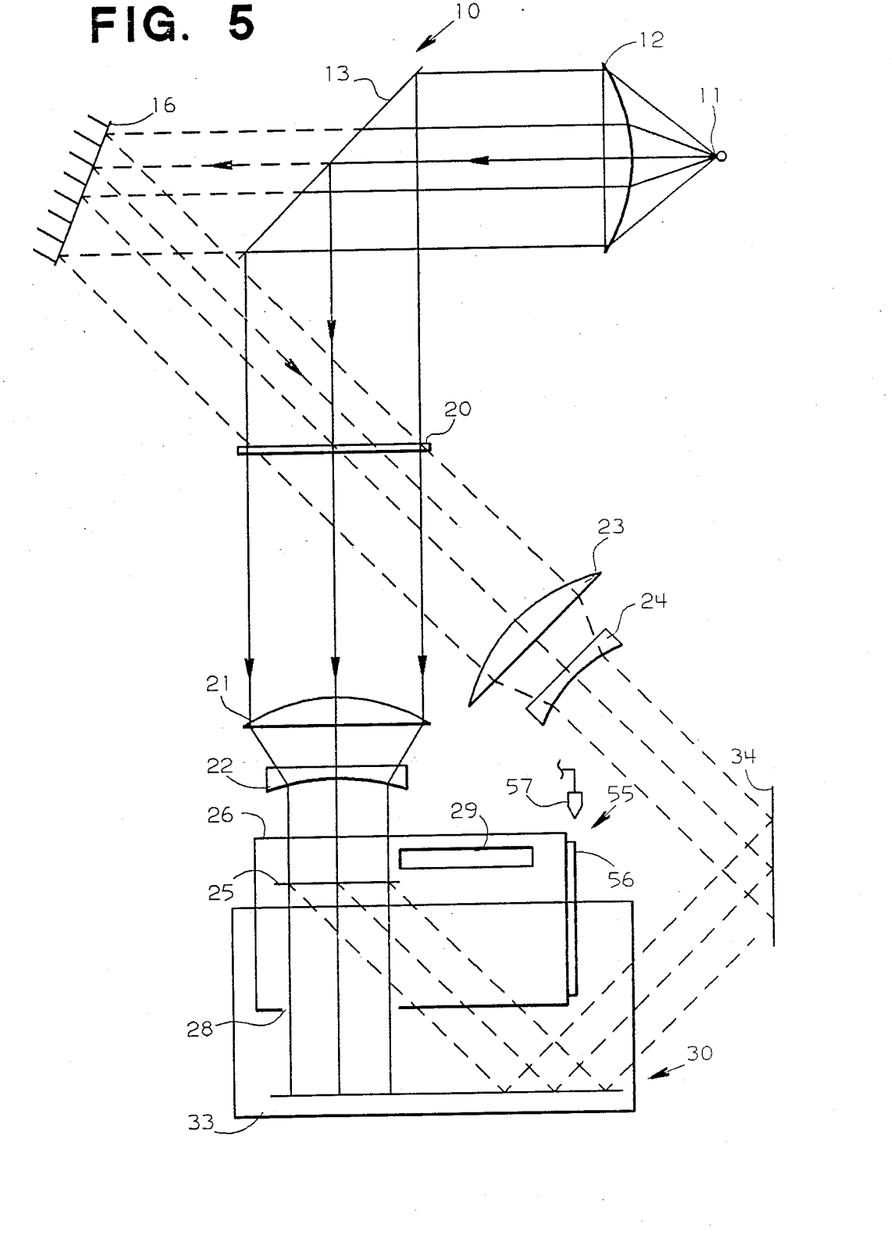
FIG. 5 is a side view schematic diagram of the two dimensional scanner of FIG. 4.

An alternate form of a two dimensional scanner 10 is shown in FIGS. 4 and 5. The illumination section of the two dimensional scanner of FIGS. 4 and 5 is the same as that of the scanner 10 in FIGS. 2 and 3. The scanning section of the scanner 10 in FIGS. 4 and 5 includes a parabolic cylindrical mirror 30 having only one section 33. The vertical parallel rays of light strike parabolic section 33 as they are passed by lens 22. The angled parallel rays of light passed by lens 24 strike a mirror 34 and are then reflected to the parabolic section 33 of mirror 30. The scanning drum 26 in this embodiment has two diametrically opposed peripheral slots 28 and 29 where slot 28 scans the vertical parallel rays of light and slot 29 scans the angled parallel rays of light reflected by parabolic section 33. The linear array of charge coupled devices 25 in this embodiment is fixed and receives light rays passed by the slots 28 and 29. An emitter 55 which includes an emitter wheel 56 rotating with drum 26 and a transducer 57 provides signals to image processor 200 for indicating when slots 28 and 29 are scanning the reflected light rays from section 33, respectively. The image processor 200 includes electrical circuitry of the type well known in the art for converting analog signals from the linear array of charge coupled devices 25 to digital signals. This type of circuitry is so well known that further description will not be given. In addition to the circuitry for converting the analog signals to digital signals, the image processor contains a digital computer system programmed to process the converted digital data.

The converted digital image data is entered into storage and then retrieved therefrom to develop top and angled contour sequences of the hand which has been scanned. The contour sequences are specifications of points along the contour of the scanned hand in an order traversing the outline thereof with fingers spread and without any backtracking. The technique used is described in chapter 9 of "Digital Picture Processing" by Azriel Rosenfeld and Avinash C. Kalc 1st edition 1976. The present invention also includes a faster and more efficient way of generating a contour sequence. This is done by generating the contour sequence developed by a scan as scanning takes place in FIGS. 4 and 5.

Figure 8:
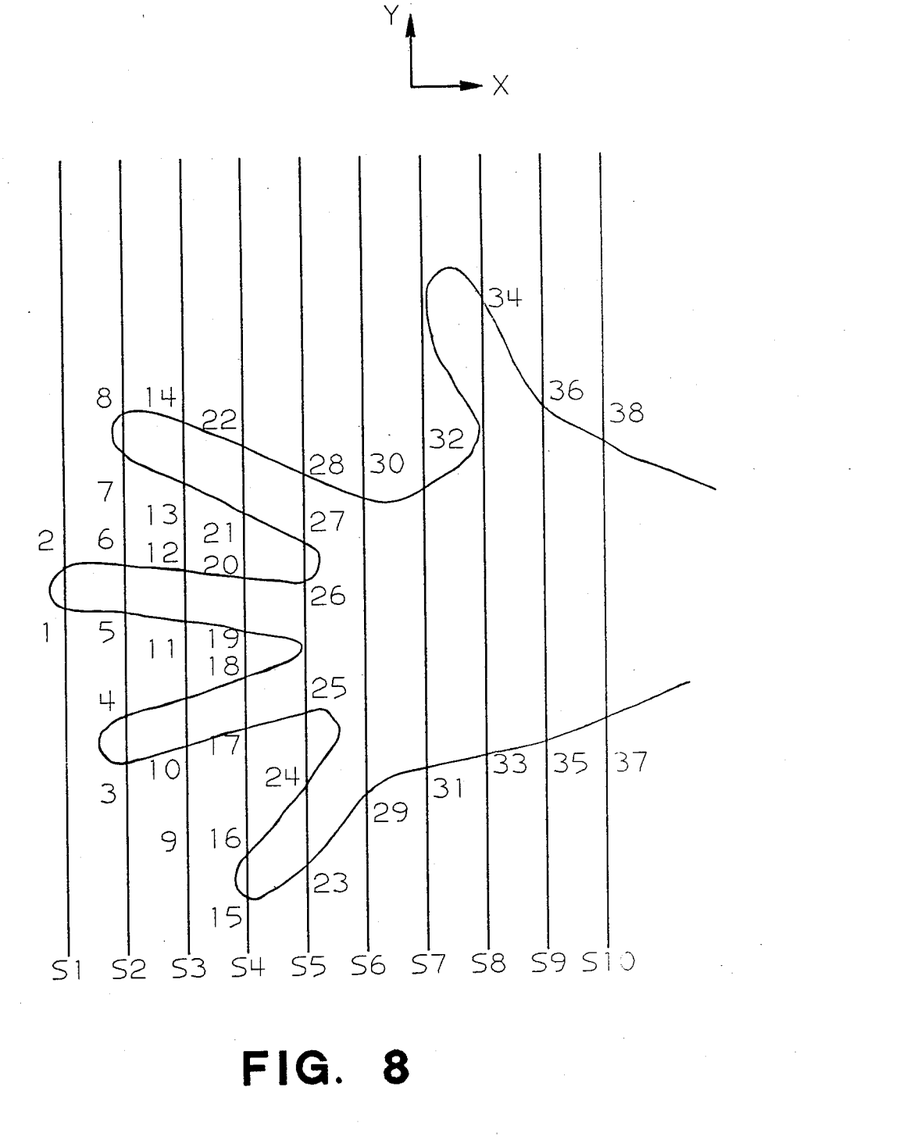
FIG. 8 is a schematic diagram illustrating contour sequence points developed during a top scan of the hand.
Figure 8A:
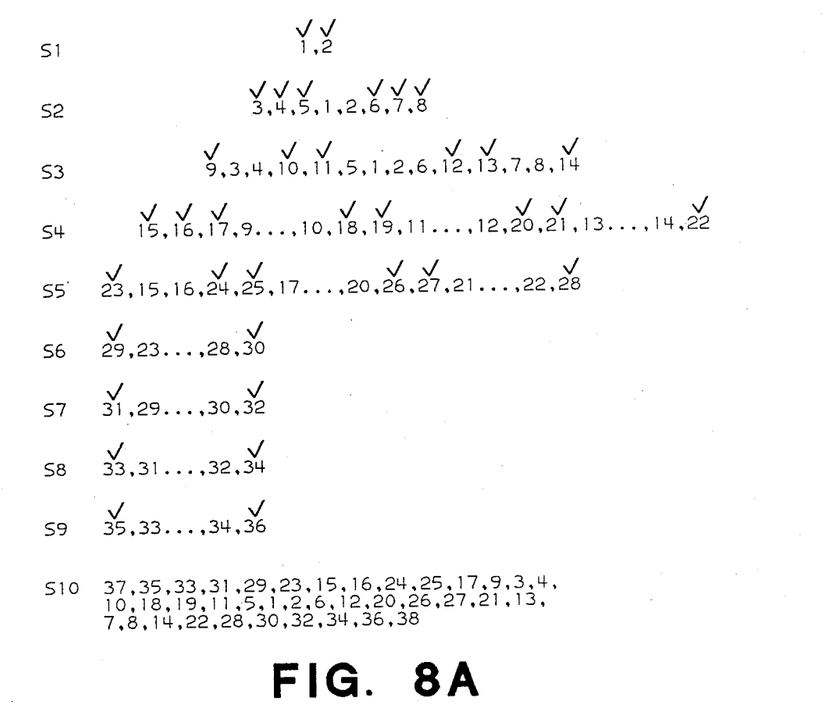
FIG. 8a is a schematic diagram showing sequence points for each scan of the scans shown in FIG. 8.
Figure 16:
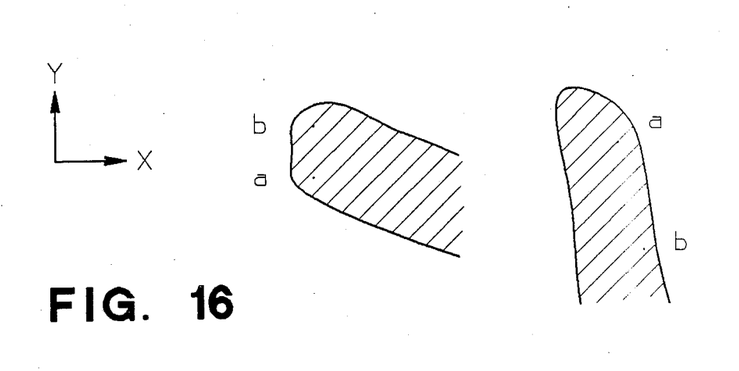
FIG. 16 is a diagram illustrating two instances where the slope of the digit contour curve is greater than 45 degrees.

For purposes of simplicity FIG. 8 illustrates scans S1–S10 inclusive which intersect parts of a hand. In reality there are many more scans, as indicated above, and there would be scans which would not intersect the hand. Thus hands of different sizes are accommodated. When a scan encounters a portion of the hand a string of digital 1's are generated by the scanner. This string is a run which terminates when the scan exits a portion of the hand. For example scan S1 has one run (1,2) whereas scan S2 has three runs [3,4] [5,6] and [7,8]. The first scan which has one or more runs starts the contour sequence. If in the i th scan there was a run [a,b] and the contour sequence generated up to that point was . . . a ...b... and [c,d] was a run in the i+1th scan then the extended sequence is ... ca ... bd ... if [c,d] and [a,b] have a y- coordinate in common. If [c,d] and [a,b] do not have any common coordinate, then if the y- coordinate of c is less than that of a, then the sequence becomes ... cda ... b ... or if the y-coordinate of c is greater than that of a, the sequence becomes ... a ... bcd .... When a run [c,d] of a present scan with more than one run of the previous scan, for example run [25,26], FIG. 8, intersects with runs [17,18] and [19,20] then the two runs are considered as a single run [17,20]. A step by step derivation of the contour sequence is shown in FIG. 8a. In FIG. 16 two instances are shown where the steapness of the slope of the contour curve is greater than 45 degrees to the x axis. In such instances there is a re-scan of the contour sequence where a and b are two points or labels of a run with coordinates of [xl, yl] and [x2,y2] respectively. Let $y2-y1=n$. If $n>1$ there is a substitution of points between points a and b. This substitution is ... [x1,y1], [x2,y1+1], ..., [x2,y1+n−1], [x2,y2] ... If $n<-1$ the following substitution is made ... [x1,y1], [x1,y1−1], ... [x1,y1−n+1], [x2,y2] ... If $n=1$ or 0 or $-1$ then the coordinates of a and b are already adjacent and therefore no substitution is required.

Figure 10:
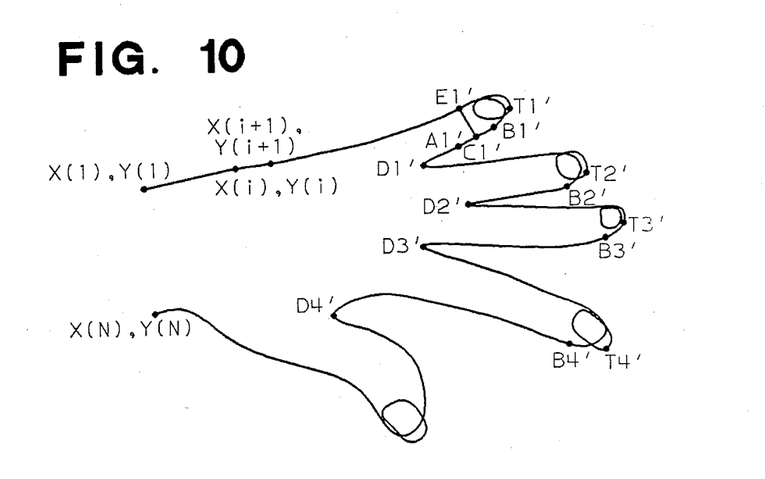
FIG. 10 is a schematic diagram illustrating reference point locations from an angled scan of a hand.
Figure 14:
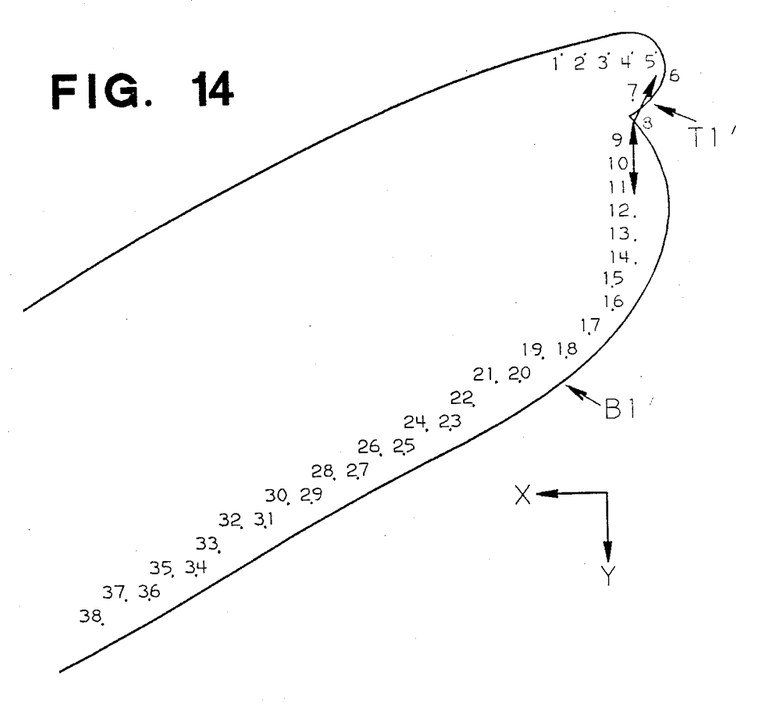
FIG 14 is a diagram illustrating the determination of $B^1$ reference points of FIG. 10.
Figure 15:
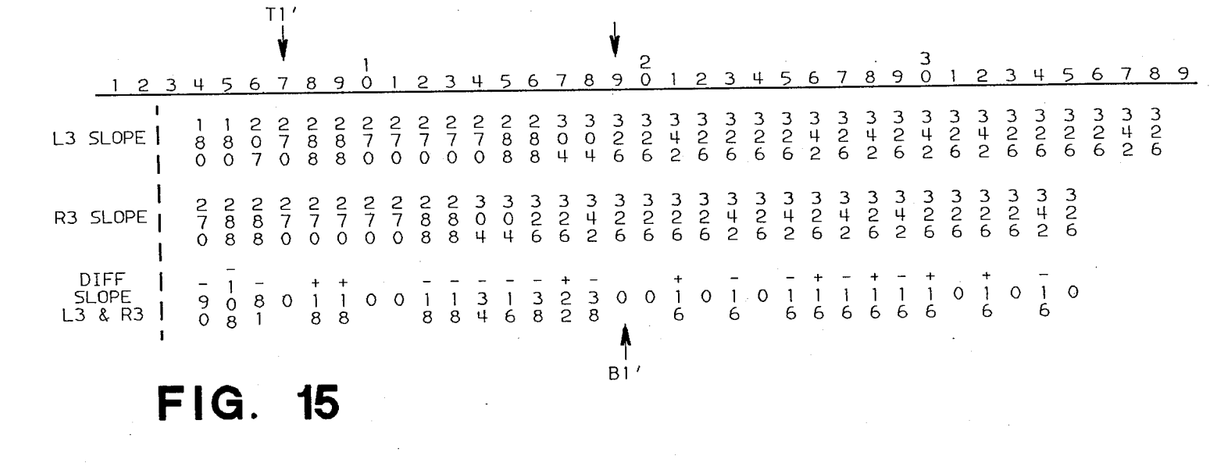
FIG. 15 is a diagram illustrating slope values used for determination of B reference point shown in FIG. 14.

In order to define stable reference points which are insensitive to variations due to finger nail length, jewelry, finger pressure or spread of fingers to facilitate hand measurement, the top and angled contour sequences are processed by image processor 200. The angled contour sequence, FIG. 10, is processed to identify apex points T1', T2', T3', and T4'. The apex points are identified by noting where the x coordinate of a point on the finger tip boundary changes direction using border or contour following techniques set forth in the above mentioned "Digital Picture Processing" reference. For example, the first point $x_i$, $y_i$ for which $x(i+1)$ is less than $x_i$ is the point T1'. The next point $x_i$, $y_i$ for which $x(i+1)$ is greater than $x_i$ is the point D1'. The next point $x_i, y_i$ for which $x(i+1)$ is less than $x_i$ is apex point T2'. In this manner all of the apex points T1', T2', T3' and T4' are established. It should be noted that these apex points are subject to variations, but they are not used as reference points for hand measurements. These apex points are used as starting points for locating reference points B1', B2', B3' and B4'. This is done by processing the angled contour sequence starting at the apex points and determining the existence of a straight line segment of at least 1.5 cm's long. This will insure a reference point which does not vary with the parameters mentioned above. It should be noted that the angled contour sequence is processed first to define the apex and B' reference points because for the angled view the lower segments of the finger nails are of a curvature quite different from the lower segments of the finger tips, irrespective of the size and shape of the finger nails. It should also be noted that the angled sequence provides a view of the fingers where the straight line segment visible on the lower side of the fingers is the natural straightness of the fingers and not as a result of depression of the fingers on glass plate 20. If it were the latter, then the variable caused by finger pressure would make the B' reference points variable. Several criterions for determining that a digital arc is a straight line segment are set forth in image processing literature. The method used in the present invention uses the difference between the left and right k slope of a point. The k slope of a point i is the slope of the line joining the point i with the point $i+k$. In this instance k equals 3 and the largest angle between any two slope vectors is 18 degrees. A digital arc is considered a straight line segment if there is no point in it that has a difference 3-slope with a magnitude greater than 18 degrees. Reference point B1', FIG. 14, is determined by calculating the difference 3 slopes for the points along the contour sequence progressing away from apex point T1'. A summary of these calculations is shown in FIG. 15 where point 19 is at the start of the straight line segment of at least 1.5 cms.

Figure 9:
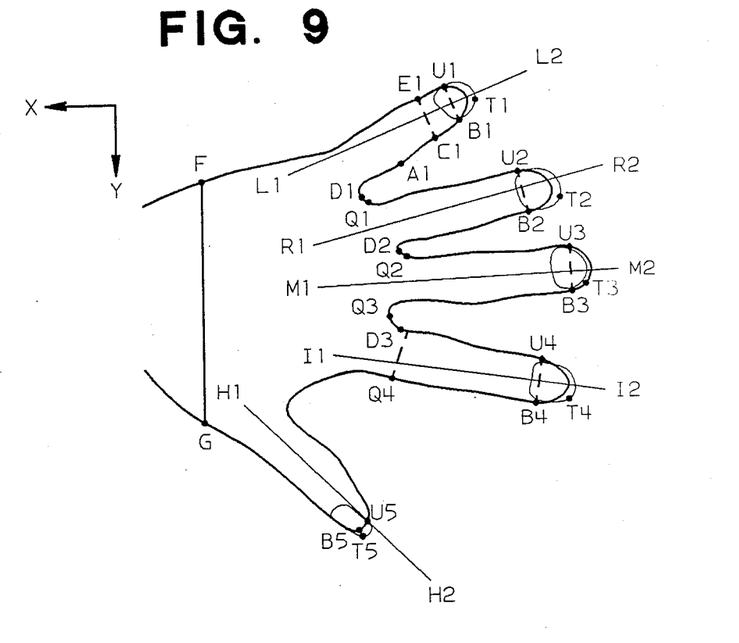
FIG. 9 is a schematic diagram illustrating the location of reference points using contour sequences from a top scan of a hand.

Once the B' reference points have been established as illustrated in FIG. 10, then the B reference points in FIG. 9 can be determined. This is done by first establishing the apex points T1, T2, T3, and T4 using the top contour sequence and then continue to process this contour sequence from apex point Ti until the x coordinate or the top contour sequence equals the x coordinate of Bi of the angled contour sequence. It will be recalled that the two contour sequences were derived from top and angled scans without movement of the hand and hence the x coordinates of the angled scan correspond to the x coordinates of the top scan.

The next set of reference points needed for making hand measurements are Q reference points located approximately at the proximal ends of the fingers. To establish the invariant Q reference points the top contour sequence is processed by the image processor 200 to first establish approximate interdigit depth points D, FIG. 9. This is done by processing the top contour sequence from the previously located points B1, B2 and B3 forward until $x_{i+1} > x_i$. When this condition occurs, the coordinate positions will be considered to define the D reference point.

Figure 12:
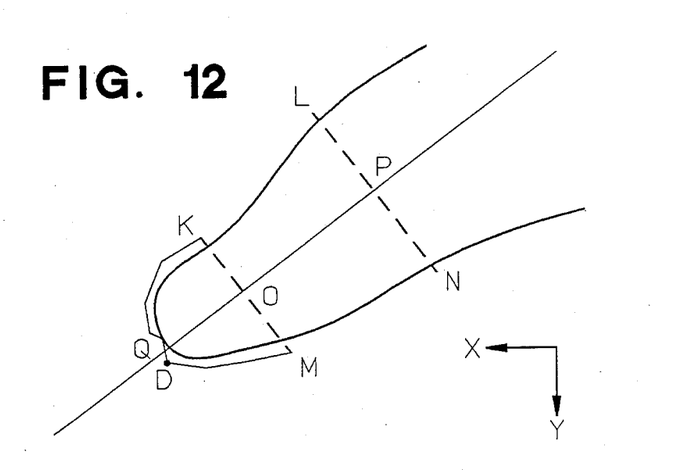
FIG. 12 is a schematic diagram illustrating the determination of Q reference points shown in FIG. 9.

After the D points have been established the top contour sequence is processed in a reverse direction, ie toward the associated B reference point, for a distance of approximately 0.5 cm to first determine a reference point K, FIG. 12; and continue processing the top contour sequence for a distance of approximately 1.5 cm form point D to define a point L. The top contour sequence is then processed forward from point D to locate points M and N in a manner similar to that for defining points K and L. Points KL and MN are then processed in a manner for defining line segments KM and LN as set forth in Chapter 9 of the above mentioned reference. The mid points O and P of these line segments KM and LN respectively, are then determined. A line passing through the mid points O and P is developed and extended toward and beyond point D to provide a reference for measuring the perpendicular distance of point D from that line. Then perpendicular distances are measured from points on either side of point D to line OP and the point being the shortest perpendicular distance from line OP is defined as point Q. In FIG. 12 point D is the closest to line OP and hence point Q is at point D. This procedure is valid for establishing reference points Q1, Q2 and Q3, but because of the possible large variance of the interdigit gap between the index finger and thumb due to the flexibility of the thumb, a different procedure is used to define point Q4.

Figure 13:
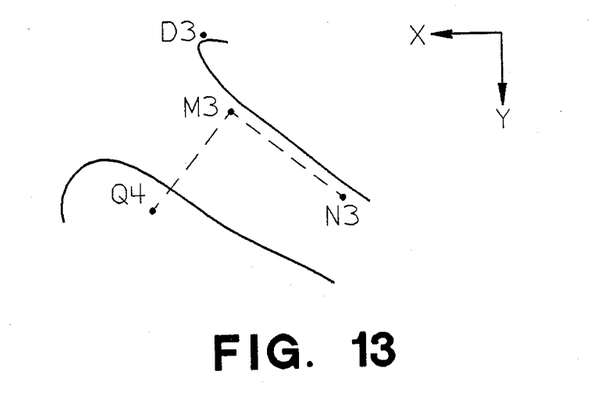
FIG. 13 is a diagram illustrating the determination of the Q reference point representing the interdigit depth point between the index finger and thumb.

The point D3 which was used in the process for defining the reference point Q3 is used for defining the reference point Q4. Starting at point D3 the top contour sequence is processed to establish point M3 FIG. 13, in a manner similar to the establishment of point K. After point M3 is established, point N3 is located in a manner similar to defining point L after defining point K in FIG. 12. Points M3 and N3 are joined by a straight line using the procedure set forth in the aforementioned reference. A perpendicular is then constructed at point M3 to extend away therefrom and perpendicular to the line M3-N3. This perpendicular line is M3-P. The top contour sequence is then processed forward from point B4 until points having a perpendicular distance from line M3-P change from a smaller to a larger value. The point with the smaller value is then defined as Q4.

With the B and Q points defined finger length measurements can be made. The length of a finger is the distance from Bi to Qi. This distance is determined by processing coordinate points between these points i.e $\sqrt{(X1-X2)^2+(Y1-Y2)^2}$ where (X1, Y1) and (X2 Y2) are the coordinates of the points Bi and Qi respectively.

Figure 11:
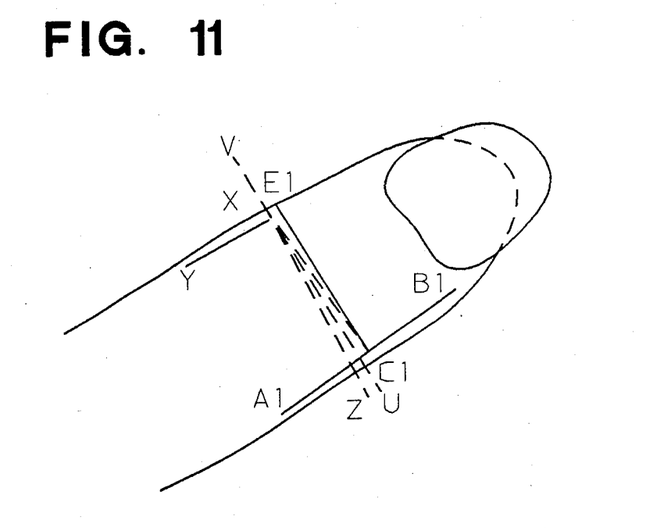
FIG. 11 is a schematic diagram illustrating the reference points and scanning for determining finger width.

Finger width is measured by prOcessing the top contour sequence from point B1 forward for approximately two centimeters to a point A1, FIG. 11. The distance B1-A1 is then determined and from this distance a midpoint C1 is established. The coordinates of: A1 is X1, Y1; B1 is (X2,Y2) and C1 is (X1+X2)/2, (Y1+Y2)/2). A perpendicular line to A1, B1 is developed extending C1 to a point V. Point X is then established in a manner similar to that used for locating point Q4 described above. The top contour sequence is then processed proceeding from point X toward the proximal end of the finger for approximately one centimeter to a point Y. A straight line X-Y is then determined and a line perpendicular to this line is developed, extending from X. Point Z is then located in a manner similar to that described above for locating point Q4. The points C1, X and Z are then processed to determine the angle C1 X Z. Using procedures of coordinate geometry, image processor 200 then operates to establish coordinate points for a line bisecting the angle C1 X Z. The slope of this bisecting line X U is then determined. Using this slope, a line C1-E1 is developed parallel to line X-U. The point E1 is determined and located in the manner described for locating point Q4. The width of the finger is then the length of the line from C1 to E1.

Finger thickness is measured by processing the angle contour sequence starting at point B1' and proceeding toward the proximal end for approximately two centimeters in a manner similar to that for determining point A1, FIG. 11, to locate point A1', FIG. 10. For purposes of brevity, a line C1' E' is developed in a manner similar to that for developing line C1 E1 for measuring finger width. The length of line C1' E1' is the 45 degree plane finger thickness measurement.

An invariant hand area measurement is made by processing the top contour sequence starting at point B1 to first develop a line B1-U1, FIG. 9, which is parallel to previously developed line C1-E1. In a similar manner lines B2-U2; B3-U3; and B4-U4 are developed. The top contour sequence is again processed starting at point U1 and proceeding toward the base of the hand for approximately 12.5 cm to a point F, FIG. 9. The top contour sequence is processed to define point T5 in a manner as previously described. It should be noted that when the fingers are held flat against glass plate 20, the thumb still rests upon its side. Processing then proceeds from T5 to a point U5 by testing the X values for a transition from decreasing X values to increasing X values. The transition point is U5. The distance from T5 to U5 is determined and this distance is used from point T5 to define the location of point B5. Line B5-U5 is developed in a manner described for other similar lines. If there is no point of inflection detected, then there is no protruding fingernail. The top contour sequence is then processed proceeding from point B5 for approximately ten centimeters to a point B5. The area of the hand is then measured as the area bounded by the contour lines of the hand where the fingers are terminated by the straight lines U1-B1, U2-B2, U3-B3, U4-B4, U5-B5 and the palm is terminated by the line FG.

Figure 17:
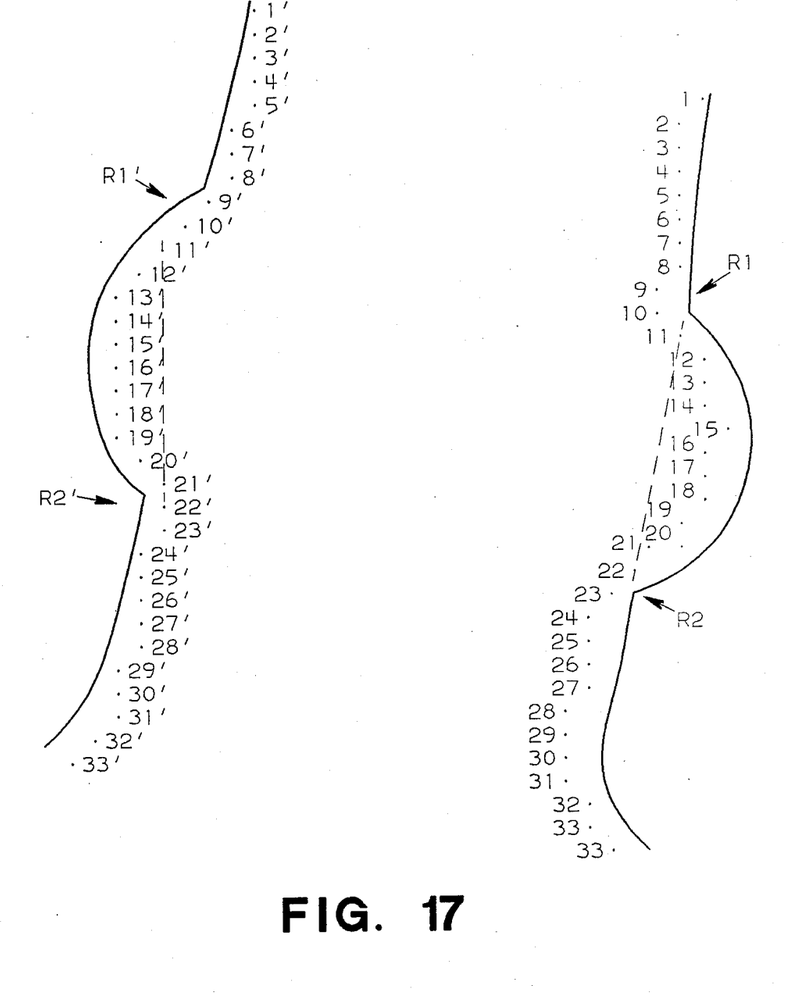
FIG. 17 is a diagram illustrating contour sequence points of a finger with a ring.
Figure 18:
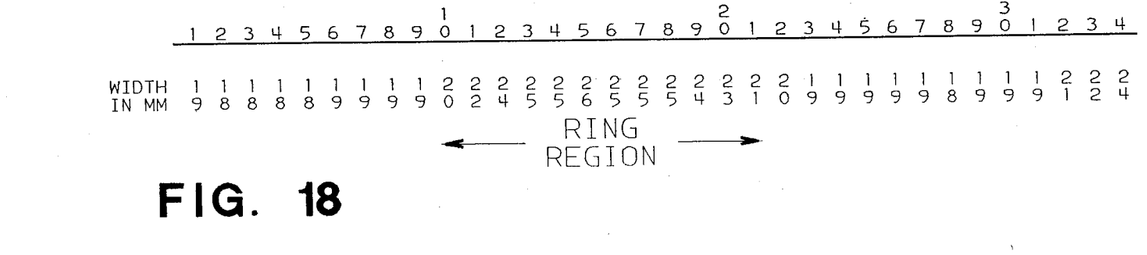
FIG. 18 is a diagram showing a table containing finger widths for the finger with a ring of FIG. 17; and, FIG. 19 is a flow chart illustrating algorithms used in determining from angled and top view sequences finger thickness, finger length, area of hand and finger width.

When processing the contour sequences to locate the interdigit reference points D, the contour sequence may indicate pronounced deviations in slope of the finger contour, which for example, could be caused by jewelry or a finger abnormality. If the deviation were caused by a permanent finger abnormality then the contour sequence would be consistent whenever the finger was scanned. If however the deviation is variable because of the wearing of jewelry, then the consistency of the contour sequence would depend upon the consistency of wearing the same jewelry in the same position each time the hand is scanned. In either event, the deviation is eliminated by measuring finger widths, in the manner indicated above, at each scan point, FIG. 17 and 18 and test for changes in width from scan point to scan point. When finger width continues to increase, stabilize and then decrease and thereafter stabilize, the scan points starting at the point where width increase is continuous and ending at the point where width decrease has terminated define the area of abnormality or where jewelry exists. These scan points are then modified in value to reflect the coordinates along lines R1 R2 and R1' R2' in FIG. 17; effectively trimming out the abnormality or jewelry. Thus the variable effect caused by the wearing of different jewelry is eliminated and the interdigit Q reference points can be determined with greater precision.

From the foregoing it is seen that the present invention provides a method and apparatus for improved hand dimensions verification. This improved method and apparatus does not require hand restraints and is independent of finger spread variations from one hand dimension verification to another for the same hand. It is further seen that the improved method and apparatus for hand dimension verification is not subject to dimensional characteristic variations introduced by growth of fingernails, false fingernails, jewelry and other like elements. The improved method and apparatus includes a hand scanner which operates to first scan the hand at one view, top view for example, and then scans the hand at another view, an angled view. The data produced by the scanner is fed to an image processor which can be a special purpose processor or the combination of a signal digitizer and a general purpose computer. The image processor develops or generates two contour sequences, top and angled from the corresponding top and angled scans. These contour sequences are then processed by the image processor as set forth in the flow diagrams of FIG. 19. The angled contour sequence from block 205 is first processed, block 210, to define or locate apex points T1', T2', T3' and T4'. The first scan point (Xi, Yi) for which Xi+1 is less than Xi is the point Ti'. Block 210 within image processor 200 implements this algorithm to establish points T1', T2', T3' and T4'. The coordinate data for these apex points is passed to block 215 which operates to process the angled contour sequence from apex points forward to detect a straight line segment of at least 1.5 cm's. in length. The beginning points of these straight line segments are reference points B1', B2', B3' and B4'. As indicated previously, there are several known methods for determining that a digital arc is a straight line segment. The method used in the present invention is to place bounds on the digital analog of curvature, i.e. the difference between the left and right K-slope of a point. The K slope of a point i is the slope of the line joining the point i with the point i+1. A K of 3 or 4 is adequate for the present invention. The bound is thus the largest angle between 3-slope vectors of adjacent points. The 3-slope vectors for the scan points encountered are shown in FIG. 15. In this instance the largest angle between any two vectors is 18 degrees. A digital arc is considered a straight line segment if there aren't any scan points in it that have a difference 3-slope with a magnitude greater than 18 degrees. The coordinates for these reference points are passed to block 216 which operates using the top contour sequence from block 206 to define the coordinate locations of B1, B2, B3, B4 reference points. The top contour sequence is first processed to define the coordinate positions of apex points T1, T2, T3 and T4. The X coordinates of reference points B1' and B1 will be equal. Hence, the top contour sequence is processed forward from the apex points, T1 for example, until a scan point (X, Y) has an X value equal to X'. This point is then B1.

Figure 19:
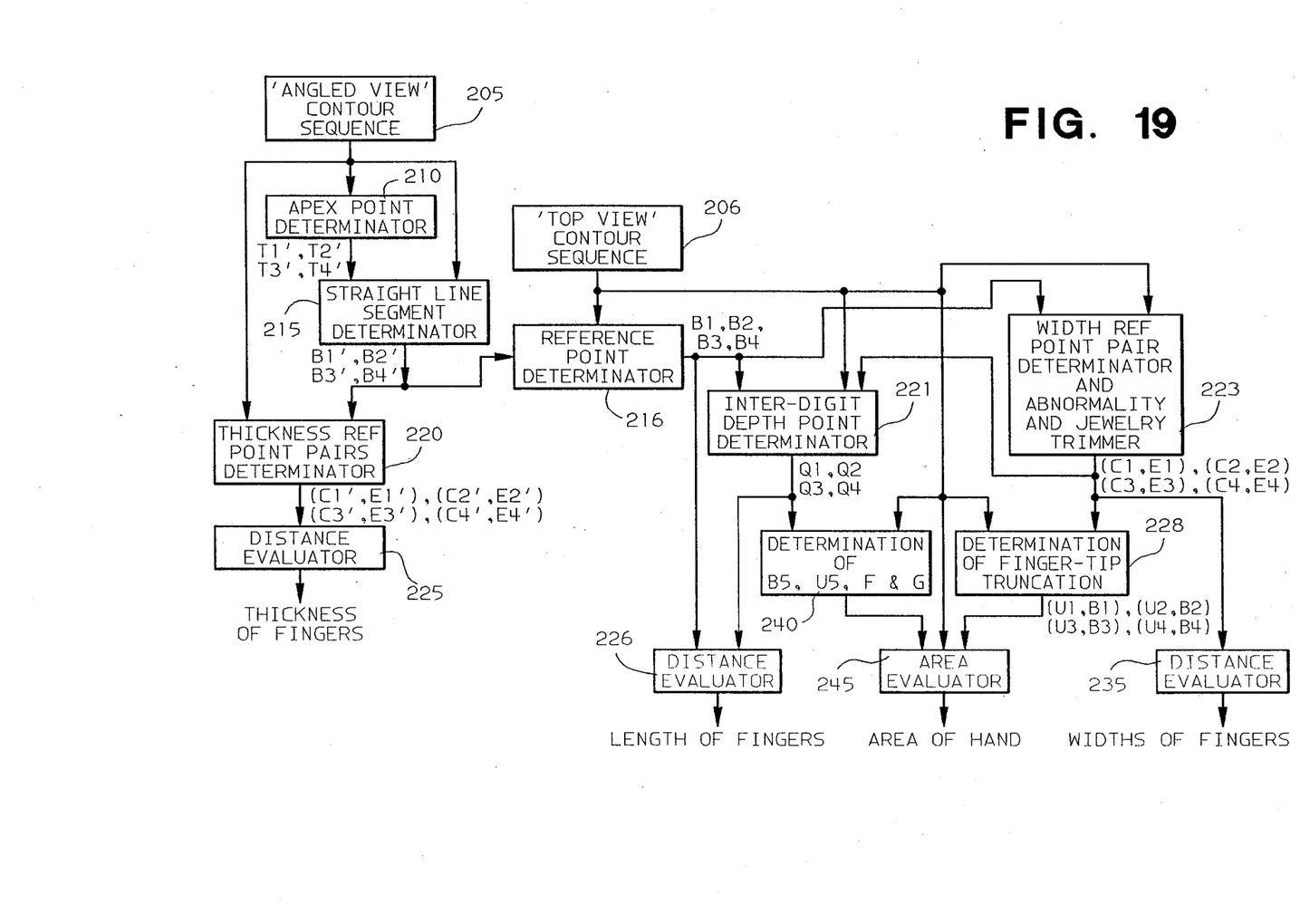

The B1', B2', B3', and B4' reference points are also applied to block 220 which uses these points for measuring a 45 degree angled finger thickness. Block 220 develops the location of coordinates for points C1' E1', C2' E2', C3' E3' and C4' E4'. Distance evaluator block 225 effectively determines the lengths of lines between the pair points C1' E1', C2' E2', C3' E3' and C4' E4'. The lengths of the lines are then the widths of the fingers.

Block 221 uses the B1, B2, B3 and B4 reference points and the top contour sequence to first establish the coordinate positions of interdigit depth points D1, D2 and D3 and then the points Q1, Q2, Q3 and Q4. The coordinates for the points Q1, Q2, Q3 and Q4 are then processed by the distance evaluator 226 together with reference points B1, B2, B3 and B4 to result in finger length measurements.

Block 223 functions in a manner similar to block 220 to define width reference point pairs C1 E1, C2 E2, C3 E3 and C4 E4 and these pair points are processed by block 235 to determine the distances between these pair points to result in finger width measurements. Block 223 also includes means for providing continuous measurements which are then used for effectively trimming out abnormalities or jewelry. These pair points are also processed by block 228 for determination of finger tip truncation to facilitate hand area measurement. Block 240 processes the top contour sequence to determine coordinates for points B5, U5, F and G, FIG. 9. The hand area measurement is then determined by area evaluator block 245 using the top contour sequence, the finger tip truncation points U1 B1, U2 B2, U3 B3, U4 B4, U5 B5 and points F and G.

While the invention has been described with reference to preferred and alternate embodiments, it should be apparent that many changes can be made without departing from the scope of the invention which is to be construed by the following claims.

Having thus described the invention, what is claimed as new and desired to be secured by Letters Patent is:

1. An improved hand dimension verification system comprising:
a scanner for scanning a hand positioned in a horizontal plane with the fingers thereof spaced apart first at one angle and second at another angle to provide two sets of hand image data, each set being a contour sequence of the entire hand and image processing means for processing said two sets of hand image data to provide hand verification measurements including finger width, finger length, finger thickness and hand area.

2. The improved hand dimension verification system of claim 1 where said first angle is substantially at 90 degrees to the hand and said second angle is substantially at 45 degrees thereto.

3. The improved hand dimension verification system of claim 1 where said finger thickness measurement is a thickness measurement at substantially 45 degrees angle to said horizontal plane.

4. The improved hand dimension verification system of claim 1 wherein said scanner comprises:
an illumination section including a point light source, a lens for converting light from said light source to a bundle of parallel light rays, a first mirror set at an angle for reflecting a portion of light from said light source passed by said lens as a bundle of parallel light rays to illuminate the hand being scanned at one angle and passing another portion of the light, a second mirror set at an angle for reflecting light passed by said first mirror to illuminate the hand being scanned at another angle, and,
a scanning section including a first lens system and a first corresponding parabolic mirror, said first lens system passing light illuminating said hand being scanned at one angle to said first corresponding parabolic mirror, a second lens system and a second corresponding parabolic mirror, said second lens system passing light illuminating said hand being scanned at another angle to said second corresponding mirror, a linear photosensitive array positioned at the focal points of said first and second parabolic mirrors, and a rotating scanning drum encircling said linear photosensitive array and having a slot for first passing light reflected by said first parabolic mirror to said linear photosensitive array and for secondly passing light reflected by said second parabolic mirror to said linear photosensitive array.

5. The improved hand dimension verification system of claim 4 wherein said first mirror is a half silvered mirror.

6. The improved hand dimension verification system of claim 4 wherein said first mirror is set at approximately 45 degree angle.

7. The improved hand dimension verification system of claim 4 wherein said second mirror is set at approximately 67.5 degree angle.

8. The improved hand dimension verification system of claim 4 wherein said linear photosensitive array is in registration with and faces said slot and rotates with said drum.

9. The improved hand dimension verification system of claim 4 wherein said first lens system comprises a first cylindrical lens for converging parallel light rays and a second cylindrical lens for diverging converging light rays to a bundle of parallel light rays having a width corresponding to the width of said linear photosensitive array and said second lens system comprises a first cylindrical lens for converging parallel light rays and a second cylindrical lens for diverging converging light rays into a bundle of parallel light rays having a width corresponding to the width of said linear photosensitive array.

10. The improved hand dimension verification system of claim 1 wherein said scanner comprises:

an illumination section including a point light source, a lens for converting the light from said point light source to a bundle of parallel light rays, a first mirror set at an angle for reflecting a portion of light rays passed by said lens as a bundle of light rays to illuminate the hand being scanned at one angle and passing another portion of the bundle of light rays, a second mirror set at an angle for reflecting light passed by said first mirror to illuminate the hand being scanned at another angle, and a scanning section including a first lens system and a first parabolic mirror, said first lens system passing light illuminating said hand being scanned at one angle to said first parabolic mirror, a second lens system for passing light illuminating said hand being scanned at another angle, a second mirror positioned in the path of light passed by said second lens system so as to reflect that light to said first parabolic mirror, a linear array of photosensitive elements and a rotating scanning drum encircling said linear array of photosensitive elements and having first and second longitudinal peripheral slots diametrically opposed from each other and having predetermined lengths whereby one slot passes light to said linear array of photosensitive elements passed by said first lens system and reflected by said first parabolic mirror and the other slot passes light to said linear array of photosensitive elements passed by said second lens system and reflected in sequence by said second mirror and said first parabolic mirror.

11. The improved hand dimension verification system of claim 10 wherein said first lens system comprises a first cylindrical lens for converging parallel light rays and a second cylindrical lens for diverging converging light rays into a bundle of parallel light rays having a width corresponding to the width of said linear array of photosensitive elements and said second lens system comprises a first cylindrical lens for converging parallel light rays and a second cylindrical lens for diverging converging light rays into a bundle of parallel light rays having a width corresponding to the width of said linear array of photosensitive elements.

12. The improved hand dimension verification system of claim 10 wherein said first lens system is in a horizontal plane.

13. The improved hand dimension verification system of claim 10 wherein said second lens system is positioned at approximately 45 degree angle.

14. The improved hand dimension verification system of claim 10 wherein said second mirror is in a vertical plane.

15. An improved hand dimension verification system comprising:

a scanner for scanning a hand positioned in a horizontal plane with the fingers thereof spaced apart, first at one angle and second at another angle to provide two sets of hand image data each set being a contour sequence of the entire hand, and, image processing means for processing said two sets of hand image data in a manner to develop invariant hand measurements.

16. The improved hand dimension verification systems of claim 15 wherein one of said invariant hand measurements is finger length, said finger length being equal to the distance from a first reference point inward of the distal finger end to a second reference point at the interdigit depth adjacent to the proximal finger end.

17. The improved hand dimension verification system of claim 15 wherein one of said invariant hand measurements is finger width, said finger width being equal to the distance from a reference point located inward of the distal finger end and at the base of a line extending parallel to the bisector of an angle formed by a first line extending across the finger and being the perpendicular bisector of a line extending between two points inward of said distal finger end along one edge thereof and a second line extending from a point where said first line intersects the other edge of said finger to said one edge of the finger, said second line being perpendicular to a straight line between said point where said first line intersects the other edge and a point located along said other edge a predetermined distance away. wherein one of said invariant hand measurements is finger thickness at an angle.

18. The improved hand dimension verification system of claim 15 wherein one of said invariant hand measurements is finger thickness at an angle to said horizontal plane.

19. The improved hand dimension verification system of claim 18 wherein said angle is approximately 45 degrees.

20. The improved hand dimension verification system of claim 18 wherein said finger thickness is measured by using image data derived by scanning at said another angle.

21. The improved hand dimension verification system of claim 15 wherein one of said invariant hand measurements is hand area, said hand area being an area bounded by a continuous line having a point of origin located at the base of the hand along the outer contour thereof and continuing along the contour thereof and along the contour of each finger and thumb and then along the base of the hand to said point of origin, the tip of each finger and thumb being truncated by a line joining opposite points inward of the distal end.

* * * * *